United States Patent Office 2,715,603
Patented Aug. 16, 1955

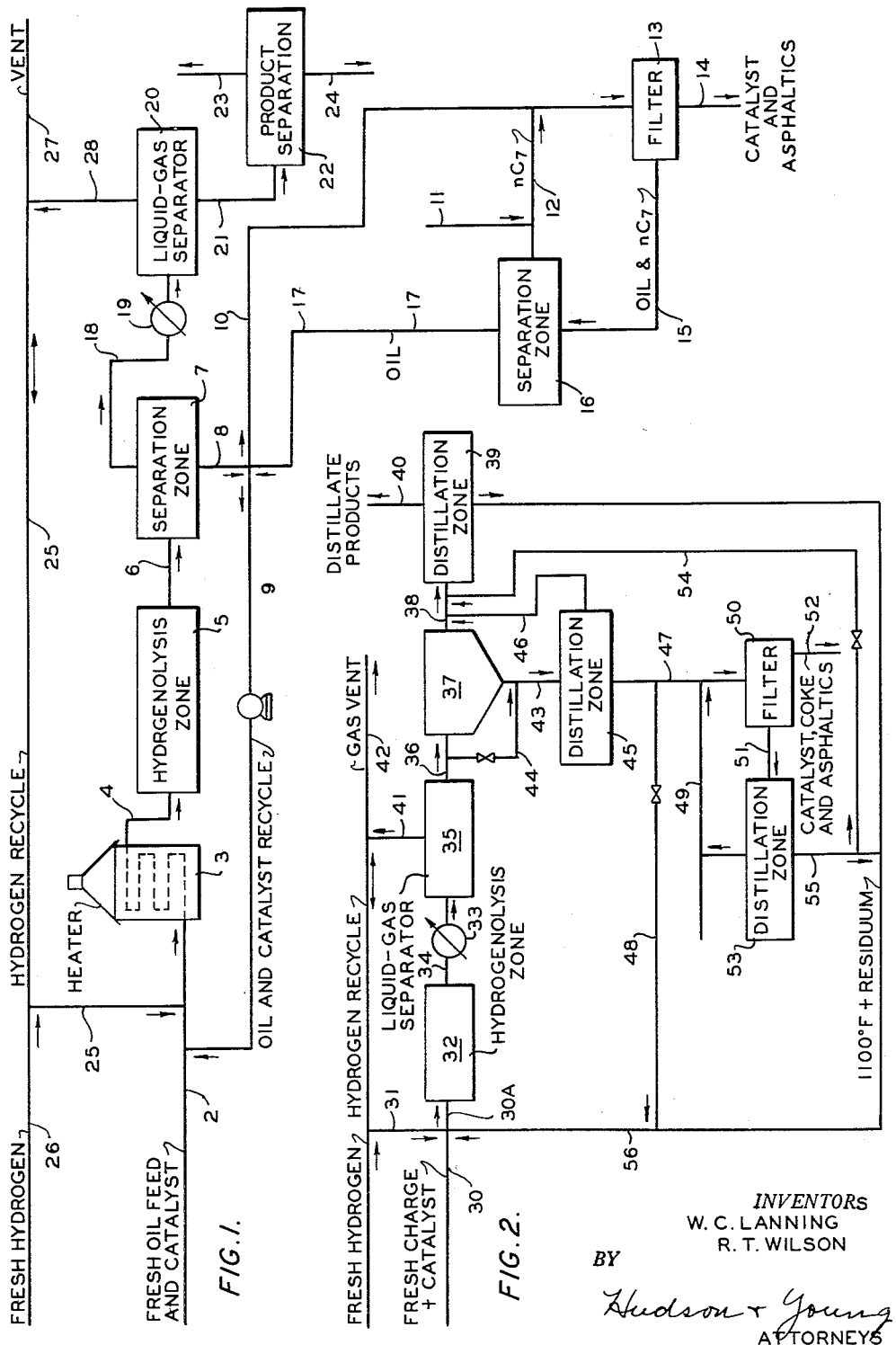

2,715,603

HYDROGENOLYSIS PROCESS UTILIZING SUSPENDED CATALYST

William C. Lanning and Reagan T. Wilson, Bartlesville, Okla., assignors to Phillips Petroleum Company, a corporation of Delaware Application September 30, 1952, Serial No. 312,262

11 Claims. (Cl. 196—53)

This invention relates to the destructive hydrogenation or hydrogenolysis of heavy oils. In one aspect it relates to an inmproved process for the hydrogenolysis of heavy oils utilizing a suspended catalyst. In another aspect it relates to the removal of asphaltenes and other heavy carbonaceous material from a recycle stream in such a process.

The hydrogenolysis of heavy oils in the presence of a catalyst has been used for a number of years to convert heavy oils having limited utility to lighter oils having greater utility. It is known to conduct such a process in the presence of a fixed-bed catalyst. It is also known to use a finely-divided or suspended catalyst in such a process. The use of a suspended catalyst has the advantage that milder reaction conditions can be utilized and higher through-puts can be attained. One difficulty accompanying the use of a suspended catalyst is that heavy carbonaceous materials, such as asphaltenes, accumulate in the high boiling fractions which are recycled to the reactor. The accumulation of such materials in the recycle streams often causes difficulties such as rapid catalyst deactivation and stoppages in conduits in the system.

According to this invention, in a process in which a heavy oil is subjected to hydrogenolysis in the presence of a suspended catalyst, the total product from the hydrogenolysis zone is passed to a gas-liquid separation zone in which a gaseous phase is separated from a liquid phase; the liquid phase is withdrawn from the separation zone and a predominantly paraffinic hydrocarbon is added to said liquid phase to precipitate asphaltenes and other heavy carbonaceous material; the liquid material is then filtered to remove the precipitated carbonaceous material together with the suspended catalyst and a clean filtrate substantially free from heavy carbonaceous materials is obtained for recycle to the reactor.

It is known in the hydrogenolysis art to withdraw from the hydrogenolysis reactor the total product and to separate the gaseous phase from the liquid phase of said product in a conventional gas-liquid separator or catch-pot at substantially the temperature of the hydrogenolysis reactor. Such practice is utilizable in connection with this invention. However, it has been found, in the hydrogenolysis of many heavy oils, that the liquid phase so obtained has a marked tendency to solidify upon cooling and it is therefore necessary in many cases to heat the liquid phase in order to maintain it in a liquid and transferable condition. The settling of asphaltenes from the liquid phase so obtained is difficult because at the temperatures at which said phase is fluent, the asphaltenes are also fluent and do not settle readily, and at lower temperatures at which asphaltenes are less fluent and would be more readily separatable, in part, by settling, the total material solidifies or assumes a non-fluent state.

Further in accordance with this invention, the foregoing problem is solved by cooling the total hydrogenolysis effluent prior to the gas-liquid separation. The total effluent is cooled to a temperature in the range 80° F. to 200° F., preferably 100° F. to 130° F.. It has been found that when such cooling is practiced, prior to settling, in accordance with this invention a liquid phase is obtained which remains normally liquid at ambient temperatures and requires no heating for transfer, and a preliminary settling of asphaltenes from the liquid phase can be effected, as subsequently described.

Further in accordance with this invention, the liquid phase of the hydrogenolysis product can be subjected to settling to obtain a solid-liquid slurry containing substantially all of the suspended catalyst. In this preliminary settling step, some of the asphaltenes adhere to the catalyst and to any coke present and are carried down with the settled catalyst and coke, thus effecting a preliminary precipitation and concentration of asphaltenes. The slurry is then treated by the addition of a normal paraffinic hydrocarbon to further precipitate asphaltenes and other carbonaceous material prior to filtration. In this mode of operation, the amount of hydrocarbon added is substantially reduced and an advantageous preliminary precipitation and concentration of asphaltenes in the settled slurry is effected. Furthermore, the precipitated asphaltenes, being admixed with coke and catalyst, are more readily settled than they would be in the absence of coke and catalyst.

In accordance with a further embodiment of the invention, the settled slurry obtained as previously described can be subjected to distillation to remove low-boiling materials prior to addition of the paraffinic hydrocarbon. The materials removed by distillation are ordinarily those boiling below 850° F. and preferably those boiling below 1100° F. This mode of operation can be practiced either with or without the settling step previously described.

The paraffinic hydrocarbon added to the liquid phase in accordance with this invention is preferably a paraffinic hydrocarbon having from 4 to 9 carbon atoms per molecule. Examples of such hydrocarbons are paraffinic naphthas, normal heptane, normal pentane, normal butane, normal hexane and normal octane. The amount of paraffinic hydrocarbon added is in the range 0.5 to 2 volumes per volume of liquid oil treated. The temperature of precipitation of the asphaltenes and other heavy carbonaceous material from the liquid phase product is in the range 40° F. to 310° F. and preferably in the range 70° F. to 210° F. The pressure used for the precipitation step is preferably sufficient pressure to maintain the mixture substantially in the liquid phase, including the added paraffinic hydrocarbon.

The oils subjected to hydrogenolysis in accordance with this invention are oils having an initial boiling point about 400° F. and more frequently are heavier oils having an initial boiling point above 700° F. In many cases, oils having an initial boiling point of at least 850° F. are used as starting materials and oils having an initial boiling point of 1100° F. and higher are also frequently used.

The catalyst used in the hydrogenolysis step can be any finely-divided catalyst known in the hydrogenolysis art. Examples of such catalysts are molybdena, iron or iron oxides, molybdenum sulfide, tin sulfide, and vanadia. Preferably the catalysts are supported on a porous support or other material having a relatively high surface area per unit weight. Examples of such supports are porous charcoal, carbon black, alumina, and silica-alumina.

The temperature of hydrogenolysis is in the range 800° F. to 950° F., preferably 850° F. to 925° F. The pressure is in the range 1000 to 10,000 p. s. i., preferably 3,000 to 6,000 p. s. i. The liquid charge rate is in the range 0.1 to 5 volumes of oil per volume of reactor space per hour, preferably 0.5 to 2 volumes per volume per hour. The hydrogen flow rate is ordinarily in the range 500 to 20,000, preferably 5,000 to 10,000, cubic feet per barrel of oil. The amount of catalyst used is in the range 0.1 to 5 weight per cent, preferably 1 to 4 weight per cent, based on the weight of the oil.

One embodiment of this invention is illustrated diagrammatically in Figure 1.

A heavy oil containing a hydrogenolysis catalyst in suspension enters heating zone 3 through inlet 2. In heating zone 3 the temperature of the oil is raised to a value near that of the hydrogenolysis temperature. Hydrogen is added through inlet 26 and conduit 25. Recycled oil and catalyst are added through conduit 9. The heated charge passes through conduit 4 to hydrogenolysis zone 5 in which the mixture is subjected to hydrogenolysis conditions previously described.

The total effluent from hydrogenolysis zone 5 passes through conduit 6 to gas-liquid separation zone 7. The gas and vapor phase from the separation zone passes through conduit 18 and cooler 19 to separator 20. Normally gaseous material is removed from separator 20 through conduit 28 and, since it contains a large proportion of hydrogen, it is recycled through conduit 25. Any unneeded excess of this gas can be removed through vent line 27. The liquid material from separation zone 20 is passed through conduit 21 to product separation zone 22 from which product fractions are removed through conduits 23 and 24. These product fractions are ordinarily gasoline and gas oil, which can be used as a catalytic cracking stock. Other fractions can, of course, be recovered as desired.

The liquid phase containing suspended catalyst is withdrawn from separation zone 7 through conduit 8. Part of this material can be recycled through conduit 9. According to this invention part of the liquid material is passed through conduit 10. A paraffinic hydrocarbon material, such as normal heptane, is mixed with this liquid material, the paraffinic hydrocarbon entering through inlet 11 and conduit 12. The mixture so obtained is passed to filter zone 13 in which suspended catalyst and precipitated asphaltenes and other carbonaceous material are removed through conduit 14. This material may be discarded or treated for recovery of the catalytic constituents as economic principles require.

The filtrate from filter zone 13 is passed through conduit 15 to separation zone 16 in which the added paraffinic hydrocarbon is recovered by distillation and recycled through conduit 12. The recovered and purified recycle oil is recycled to hydrogenolysis zone 5 through conduits 17 and 9.

Another embodiment of the invention is illustrated diagrammatically in Figure 2.

Oil and catalyst enter hydrogenolysis zone 32 through lines 30 and 30A. Hydrogen is added through line 31 and recycle material through line 56. The hydrogenolysis effluent passes through cooler 33 and line 34 and the effluent cooled in accordance with this invention, is passed to gas-liquid separation zone 35. Gaseous material is recycled through conduit 41, as previously described, excess gas being vented through outlet 42.

In separation zone 35 a normally liquid material is obtained as the liquid phase. This liquid material is passed through conduit 36 to settling zone 37, wherein suspended catalyst, together with coke and some of the asphaltenes are caused to settle out of the liquid. The settled slurry, containing catalyst, coke, asphaltenes, and some of the liquid oil, is withdrawn from the bottom of settling zone 37 and passed through conduit 43 to distillation zone 45. Clarified liquid is withdrawn from zone 37 through conduit 38 and passed to product distillation zone 39, distillate products being recovered through outlet 40 and heavier materials being recycled through line 56.

If desired, part or all of the liquid phase can be bypassed around settling zone 37 through conduit 44.

In distillation zone 45 the slurry is subjected to distillation to remove the material boiling below 850° F. When desired, the distillation may be carried further to remove material boiling below 1100° F. The distillate is removed through line 46 and passed to line 38. Part of the residue from distillation zone 45 can be recycled through lines 48 and 56. The remainder is passed to filter zone 50, a paraffinic hydrocarbon such as normal heptane being added through conduit 49 to further precipitate asphaltenes and other heavy carbonaceous material. The solids from filter zone 50 are removed through outlet 52. This solid material includes catalyst, asphaltenes and other precipitated carbonaceous material. The filtrate is passed through conduit 51 to distillation zone 53 wherein the added paraffinic hydrocarbon is recovered by distillation and recycled through line 49. The purified oil obtained as a residue of distillation zone 53 can be recycled through lines 55 and 56. Part of the recovered oil can be passed through line 54 to distillation zone 39 if desired, particularly when it is desired not to utilize distillation zone 45 but to by-pass it by means now shown.

The embodiment shown in Figure 2 has two advantages, namely, (1) a normally liquid material is always obtained in liquid-gas separator 35, and (2) the amount of added paraffinic hydrocarbon used to precipitate asphaltenes, and also the filtration capacity required, are reduced.

EXAMPLE I

The following table shows data obtainable in a suspended catalyst hydrogenolysis process wherein precipitation of carbonaceous materials in the recycle stocks is not practiced. It is evident from the last column in this table that the product residue boiling above 850° F. contains large amounts of carbonaceous material, as evidenced by the Ramsbottom carbon residue.

The charge material in this process was a distillation residue obtained in a commercial refinery. The hydrogenolysis was conducted at a total pressure of 4,000 p. s. i., a temperature of 875° F., a liquid charge rate of 2 volumes per volume of reactor space per hour, and a hydrogen flow rate of 10,000 cubic feet per barrel of oil.

*Catalytic hydrogenolysis of refinery distillation residue*

| Run No. | Product, API Gravity | Conversion (Vol. Percent) | Hours On Stream | Catalyst | | | 850° F.+ Residue | | |
|---|---|---|---|---|---|---|---|---|---|
| | | | | Wt. Percent of Chg. | Wt. Percent Promoter | Support | Yield (Vol. Percent) | Gravity, API | Ramsbottom Carbon Residue |
| Chg | | | | | | | 80.5 | 21.9 | 6.9 |
| 8 | 34.9 | 80.6 | 12 | 4 | 2—MoO₃ | Activated Charcoal | 15.6 | 16.2 | 5.8 |
| 11 | 35.0 | 82.4 | 7 | 1 | 2—MoO₃ | ___do___ | 14.2 | 13.2 | 14.6 |
| 12 | 34.1 | 76.1 | 7 | 1 | 5—Fe | ___do___ | 19.3 | 14.7 | 12.5 |
| 13 | 35.9 | 87.1 | 7 | 1 | ___do___ | ___do___ | 10.4 | 13.2 | 14.0 |
| 14 | 35.5 | 86.4 | 6 | 1 | 5—Fe | Pelleted Carbon Black | 11.0 | 9.3 | 18.5 |
| 15 | 36.4 | 88.6 | 5 | 1 | | ___do___ | 9.2 | 8.8 | 18.2 |

By treatment of the recycle material according to this invention the carbonaceous materials in the recycle stream can be reduced, as shown in the subsequent examples.

EXAMPLE II

The total liquid products from two hydrogenolysis runs of the type described in Example I were centrifuged to yield a solid-free "decant" oil and a slurry containing about 50% solids, which included the suspended catalyst. In order to separate the insoluble catalyst from such materials as asphaltenes, the slurry was extracted with benzene to recover a "solids" oil. The decant and the solids oils were distilled to remove material boiling below 850° F. Normal heptane was then added to the distillation residue in the ratio of 10 ml. to 1 gram of the oil. The data in the following table show the amounts of materials of the types of asphaltenes removed by precipitation with the normal heptane. The precipitation was conducted at approximately the boiling point of normal heptane at atmospheric pressure.

| Charge | Fuel Oil | | | Residuum | | |
|---|---|---|---|---|---|---|
| | Decant Oil | Solids Oil | Charge | Decant Oil | Solids Oil | Charge |
| 850° F.+product, wt. percent of charge | 36.1 | 13.5 | 87.4 | 43.1 | 6.3 | 100 |
| Asphaltenes:[1] | | | | | | |
| Wt. percent of 850° F.+ product | 8.2 | 43.2 | -------- | 4.8 | 36.6 | -------- |
| Wt. percent of charge | 3.0 | 5.8 | -------- | 2.1 | 2.3 | -------- |
| Total, wt. percent of charge | 8.8 | 8.8 | 9.9 | 4.4 | 4.4 | .07 |

[1] Insoluble in n-heptane.

The above data show that deleterious carbonaceous or asphaltic materials are effectively removed from the hydrogenolysis products by precipitation with normal heptane according to this invention.

EXAMPLE III

In a hydrogenolysis system of the type illustrated in Figure 2, a residuum oil having an initial boiling point of about 1100° F. is subjected to hydrogenolysis. A conversion of 80% is obtained per pass. The products are materials boiling from the boiling point of pentanes to 1100° F. The amount of catalyst used is 1% by weight of the charge, converted. The flow system is substantially the same as that in Figure 2 except for the fact that a centrifuge is used in place of settling zone 37. The material withdrawn from the centrifuge through line 43 contains 30 weight per cent total solids, including asphaltenes. In distillation zone 45, materials boiling below 1100° F. are removed from the slurry. The amount of normal heptane added through line 49 is five volumes per volume of slurry. The following table shows the relative weight proportions of the materials in the several conduits, based on 100 parts by weight of the residuum charge. The numerals at the head of each column in the following table correspond to the reference numerals in Figure 2 indicating the conduits in the system.

to distillation zone 45, which is operated as described in Example III. The following table shows the data obtained which correspond to the data in the table in Example III.

| Conduit | Stream Proportions, Parts by Weight | | | | | |
|---|---|---|---|---|---|---|
| | 30 | 30A | 36, 44 and 43 | 46 | 52 | 56 |
| Distillate | | | 94 | 94 | | |
| 1100° F. + oil | 100 | 125 | 25 | | | 25 |
| Catalyst | 1 | 1 | 1.0 | | 1.0 | |
| Coke | | | 1.8 | | 1.8 | |
| Asphaltenes | | | 3.8 | | 3.8 | |

The data in Examples III and IV show that asphaltenes are effectively removed according to the process of this invention and further that the elimination of a settling or centrifuging zone results in an increased amount of residual oil which has to be treated for the removal of catalyst, asphaltenes and other carbonaceous materials. Thus, the volume of residual oil treated according to Example III was only about one-eighth of that treated according to Example IV and much larger quantities of paraffinic hydrocarbon and larger filtration capacity were required in Example IV.

The amount of asphaltenes and other carbonaceous impurities removed from the recycle oil can be varied as desired by varying the proportions of added paraffinic hydrocarbon within the disclosed limits.

It is evident from the foregoing disclosure that catalyst concentrations in the hydrogenolysis zone can be increased or decreased as desired by varying the proportions of catalyst returned to the reactor in suspension in the recycled oil.

Variation and modification are possible within the scope of the foregoing disclosure and the claims to this invention, the essence of which is that a suspended catalyst type hydrogenolysis process can be operated and the undesired accumulation of heavy carbonaceous materials in the recycle stream can be minimized by separating a total reactor effluent into a gas phase and a liquid phase, adding to said liquid phase a paraffinic hydrocarbon having from 4 to 9 carbon atoms per molecule, filtering the mixture so obtained and returning the filtrate to the hydrogenolysis reactor after recovery of the added paraffinic hydrocarbon; that further improvement in the process is obtained by cooling the total hydrogenolysis product prior to the gas-liquid separation; that still further improvement is obtainable by subjecting the liquid phase to settling or centrifuging prior to treatment with the paraffinic hydrocarbon; and that still further improvement is obtained by distilling materials boiling below 850° F. from the liquid phase prior to addition of said paraffinic hydrocarbon. Methods other than filtration, e. g. centrifuging or decanting, can be used to remove catalyst and precipitated carbonaceous impurities from the paraffin-treated recycle oil.

We claim:
1. In a process in which a hydrocarbon oil having an initial boiling point higher than 400° F. is subjected to

| Conduit | Stream Proportions, Parts by Weight | | | | | | | |
|---|---|---|---|---|---|---|---|---|
| | 30 | 30A | 36 | 38 | 43 | 46 | 52 | 55 | 56 |
| Distillates | | | 94 | 81.2 | 12.2 | 12.2 | 0 | | |
| 1100° F. + oil | 100 | 125 | 25 | 21.8 | 3.2 | | 0 | 3.2 | 25 |
| Catalyst | 1 | 1 | 1.0 | | 1.0 | | 1.0 | | |
| Coke | | | 1.8 | | 1.8 | | 1.8 | | |
| Asphaltenes | | 3.1 | 6.9 | 3.1 | 3.8 | | 3.8 | | 3.1 |

EXAMPLE IV

In a system of the type shown in Figure 2, centrifuge or settling zone 37 is omitted, the liquid phase from separation zone 35 being passed through conduits 36 and 44 hydrogenolysis in the presence of a suspended hydrogenolysis catalyst, the improvement which comprises the following steps in combination: subjecting a total hydrogenolysis product to gas-liquid separation to produce a gaseous phase and a liquid phase containing a suspended catalyst, adding to said liquid phase from 0.5 to 2 volumes per volume of said liquid phase of a predominantly paraffinic hydrocarbon having from 4 to 9 carbon atoms per molecule, thereby precipitating asphaltenes and other carbonaceous impurities, removing solids from the system, recovering a solid-free oil and recycling a heavy fraction of said oil, free of precipitated asphaltenes and carbonaceous impurities, to the hydrogenolysis step.

2. In a process in which a hydrocarbon oil having an initial boiling point of at least 850° F. is subjected to hydrogenolysis in the presence of a suspended hydrogenolysis catalyst, the improvement comprising the following steps in combination: cooling the total effluent from the hydrogenolysis step to a temperature in the range 80° F. to 200° F., subjecting the cooled effluent to gas-liquid separation to obtain a gaseous phase and a liquid phase, adding to said liquid phase from 0.5 to 2 volumes of a predominantly paraffinic hydrocarbon containing from 4 to 9 carbon atoms per molecule, filtering the mixture so obtained to recover a liquid hydrocarbon mixture substantially free from asphaltenes and other heavy carbonaceous impurities, recovering said paraffinic hydrocarbon from said oil and recycling a fraction of said oil boiling above 850° F. to the hydrogenolysis step.

3. In a process in which a hydrocarbon oil having an initial boiling point of at least 850° F. is subjected to hydrogenolysis in the presence of a suspended hydrogenolysis catalyst, the improvement which comprises the following steps in combination: subjecting the total hydrogenolysis effluent to cooling to a temperature in the range 100° F. to 130° F., subjecting the cooled effluent to gas-liquid separation to obtain a gaseous phase and a liquid phase, subjecting said liquid phase to separation conditions to obtain a solid-free oil and a slurry, adding to said slurry from 0.5 to 2 volumes of a predominantly paraffinic hydrocarbon having from 4 to 9 carbon atoms per molecule, filtering said slurry to obtain a filtrate oil substantially free from carbonaceous impurities, recovering said paraffinic hydrocarbon from said filtrate oil, and recycling a fraction of said filtrate oil boiling above 850° F. to the hydrogenolysis step.

4. The process of claim 3 in which said predominantly paraffinic hydrocarbon is a paraffinic naphtha.

5. The process of claim 3 in which said predominantly paraffinic hydrocarbon is n-butane.

6. The process of claim 3 in which said predominantly paraffinic hydrocarbon is normal pentane.

7. The process of claim 3 in which said predominantly paraffinic hydrocarbon is normal heptane.

8. The process of claim 3 in which said predominantly paraffinic hydrocarbon is normal octane.

9. The process of claim 3 in which said slurry is subjected to distillation to remove materials boiling below 1100° F. prior to addition of said predominantly paraffinic hydrocarbon.

10. The process of claim 3 in which said slurry is subjected to distillation to remove materials boiling below 850° F. prior to addition of said predominantly paraffinic hydrocarbon.

11. In a hydrogenolysis process in which a hydrocarbon oil having an initial boiling point of at least 850° F. is subjected to hydrogenolysis in the presence of a suspended hydrogenolysis catalyst at a temperature in the range 800° F. to 950° F., a total pressure in the range 1,000 to 10,000 p. s. i., a liquid space velocity of 0.1 to 5 volumes of said oil per volume of reactor space per hour, and a hydrogen flow rate in the range 500 to 20,000 cubic feet of hydrogen per barrel of oil, the amount of catalyst suspended in said oil being in the range 0.1 to 5 weight per cent of said oil, the improvement which comprises the following steps in combination: cooling the total hydrogenolysis effluent to a temperature in the range 80° F. to 200° F.; subjecting the cooled effluent to gas-liquid separation to obtain a liquid phase and a gaseous phase; subjecting said liquid phase to settling to obtain a solid-free oil and a slurry; recovering said solid-free oil as a product of the process; subjecting said slurry to distillation to remove materials boiling below 1100° F.; recycling part of the distillation residue to the hydrogenolysis step; adding to the remainder of the residue from said distillation from 0.5 to 2 volumes of normal heptane per volume of said slurry; maintaining said slurry at a temperature in the range 70° F. to the boiling point of normal heptane, whereby heavy carbonaceous impurities are precipitated; filtering the mixture to obtain a hydrocarbon mixture substantially free of heavy carbonaceous impurities; recovering normal heptane from said mixture; and recycling the normal heptane-free material so obtained to the hydrogenolysis step.

References Cited in the file of this patent

UNITED STATES PATENTS

| | | |
|---|---|---|
| 2,447,149 | Wier | Aug. 17, 1948 |
| 2,502,958 | Johnson | Apr. 4, 1950 |
| 2,559,285 | Douce | July 3, 1951 |